May 4, 1965
L. J. DAVIES
3,181,346
METHOD AND APPARATUS FOR MEASURING THE GAS
PERMEABILITY OF PERMEABLE BODIES
Filed Feb. 26, 1962
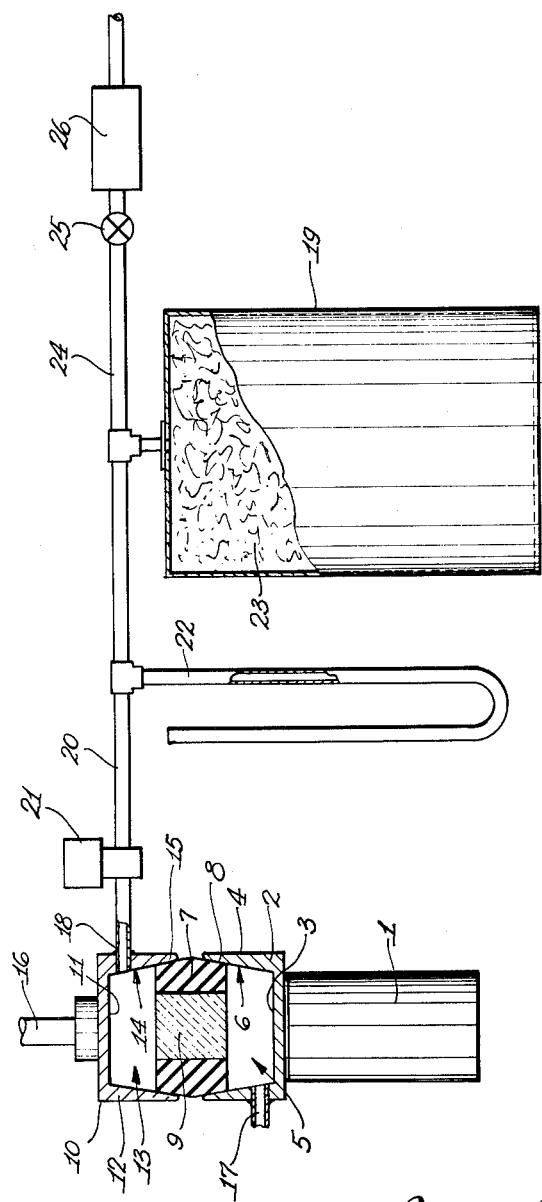
INVENTOR
Leslie John Davies 3,181,346
METHOD AND APPARATUS FOR MEASURING THE GAS PERMEABILITY OF PERMEABLE BODIES
Leslie J. Davies, Lachute, Quebec, Canada, assignor to Canadian Refractories Limited, Montreal, Quebec, Canada
Filed Feb. 26, 1962, Ser. No. 175,528
1 Claim. (Cl. 73—38)

This invention relates to a method and apparatus for measuring the gas permeability of permeable bodies.

Knowledge of the permeability of a material towards the passage of fluids is important for many applications. For example, the permeability of rock must often be established to assess the production of an oil field. The permeability of soils often affects its fertility and its usefulness for engineering purposes. The permeability of a compacted powder, under standard conditions, can be related to the surface area and particle size of the powder, and this test is commonly used in the cement industry. Likewise, permeability is a factor which must be closely controlled in the formulation and production of cores for foundry moulds. In the refractory industry, the permeability of refractory materials is of prime importance in many cases, since this property affects the rate of slag penetration and, therefore, attack on the refractory, and also the rate of gas penetration, which can measurably affect the thermal losses through a refractory lining.

The rate of fluid flow through a permeable material is proportional to the permeability of the material, the area exposed to the flow, and the pressure drop across the material; and inversely proportional to the thickness through which the fluid flows, and to the viscosity of the fluid.

Methods of measuring permeability generally rely on measurements of fluid flow perpendicularly through a specimen of uniform cross-section. The methods can be subdivided into two types; those which produce a steady pressure difference and therefore a steady fluid flow through the specimen, and those which produce a decreasing pressure difference across the specimen and, therefore, a transient fluid flow through it.

In the case of the steady flow methods, a specimen is prepared and mounted so that fluid under pressure, when applied to one face will flow through the specimen perpendicularly to the pressurized face. The fluid is either a liquid or a gas, and means are provided to supply fluid to one face of the specimen at a constant and elevated pressure. Means for accurately regulating the pressure and measuring the rate of flow are provided, and readings are taken once a steady state has been set up. An advantage of this method is that the readings can be directly inserted into the appropriate equation and the permeability calculated simply. The main disadvantage is that the equipment used is rather elaborate and accurate pressure regulating and flow metering instruments are expensive.

In the transient flow method, a compressible fluid, generally a gas, such as air, is confined under slight pressure in a fixed volume. At a given instant, the pressurized gas is allowed to discharge through the specimen, mounted in the same manner as for the previous method.

The pressure in the gas in the fixed volume is monitored by a sufficiently precise manometer, and means are provided to determine the external pressure. The pressure difference across the specimen decreases in a negative exponential manner with time and, provided the conditions are isothermal, the relationship can be expressed quantitatively, so that two simulataneous readings of both pressure and time can be used to determine the sample's permeability. If the conditions are not isothermal, multiple or continuous readings must be resorted to in order to derive graphical solution.

The use of transient flow methods and equipment is well known in the art. Such prior art uses, however, fail to compensate for inherent temperature changes which occur and would give inaccurate results if employed for testing materials in the permeability range of usual refractories. As gas is bled from its pressurized container, the remaining gas undergoes adiabatic expansion. When this occurs, the walls of the container give off heat, tending to restore the original temperature. If very large gas reservoirs are used in equipment to test materials with very low permeability, very small rates of gas flow are involved and enough heat is released by the walls tending to compensate for the cooling produced by expansion, i.e., the expansion will be essentially isothermal. If the materials tested have too great a permeability, however, the container cannot supply enough heat and the expansion becomes neither isothermal nor adiabatic and non-correctable errors occur because the effect of temperature on the pressure throughout the test cannot be calculated. For apparatus involving reasonably sized reservoirs (e.g. 20 litres), and conveniently-sized test specimens having a permeability normally found in refractory bricks, the rate of gas flow from the reservoir is large enough to produce appreciable cooling, producing errors of several percent in permeability values, unless elaborate precautions are taken to compensate. These precautions involve the pre-calibration of each apparatus at various permeabilities, or the continuous monitoring of pressure versus time relations, and the use of graphic methods of calculation. A further disadvantage of these prior methods is that a temperature change is also involved when the reservoir is charged with gas; unless a suitable waiting period is allowed, non-isothermal conditions will produce fallacious results.

If, in these methods, no account is taken of the cooling of the gas in the reservoir, the cooling itself will produce a decrease in pressure and the net effect is that the pressure decreases faster than expected. If the test is allowed to run from a given high pressure to a given low pressure, the time interval measured will be shorter than would have been obtained under the assumed isothermal conditions. Since the relation between permeability and time is an inverse one, this means that neglect of cooling effects produces over estimates of permeability.

It is an object of this invention to provide a simple and inexpensive method and apparatus for measuring the gas permeability of permeable bodies which may be employed to determine permeability in a rapid and accurate manner.

The invention will be described with reference to the accompanying drawing, the single figure of which illustrates schematically the apparatus of the invention.

In the drawing, 1 is a supporting pedestal on which is mounted a lower end piece 2 comprising a metal member having a closed bottom wall 3 seated on the pedestal and a side wall 4 forming a cavity 5. The interior surface 6 of the side wall 4 is bevelled, as shown, i.e., the surface 6 flares outwardly towards the mouth of the cavity.

A rubber or like elastic gasket 7 is arranged for seating in the upper portion of the cavity 5, the gasket having a bevelled outer surface 8 complementary to and engageable with the surface 6 of the cavity. The gasket is adapted to carry an axially disposed sample 9 of the material to be tested. It will be observed that the sample has a slip fit in the gasket.

A second or upper end piece 10 is substantially identical with end piece 2. It has a closed bottom wall 11, side wall 12, cavity 13, and bevelled inner surface 14.

It will be observed that the end piece 10 is arranged to be seated on the gasket 7 which has a bevelled outer surface 15 for engagement with the cavity surface 14.

The assembly, comprising end pieces 2 and 10 and sample-containing gasket 7, is subject to pressure as by means of a jack or the like 16 acting upon the wall 11 of end piece 10 to press the end pieces towards each other to compress the elastic gasket 7 and thus seal the sides of the sample carried thereby. The sample may have any desired plan contour, such as circular or square, and the gasket aperture must, of course, correspond.

End piece 2 has an orifice 17 venting the cavity therein to the atmosphere. End piece 10 has an orifice 18 by which its cavity 13 is connected to a gas reservoir 19 by a tube 20. A valve 21, preferably of quick-opening type, and a manometer 22 are connected in the tube 20. The internal diameter of tube 20 (and the opening in valve 21) must be large enough to avoid any pressure drop along the tube or across the valve when in use.

The reservoir 19 is a gas-tight vessel preferably of metal. It contains, substantially uniformly distributed throughout its interior, a material 23 having a relatively high surface/volume ratio, high specific heat and heat transfer properties. Examples of such a material include steel wool, copper turnings, a roll of wire mesh, shredded metal foil, or lightweight heat transfer devices such as Raschig rings. The material may be defined as a mass of strands of a metal of a specific heat not substantially less than 0.08 calorie per gram per degrees C., each strand being in engagement with a plurality of other strands, and such mass in any transverse section thereof having a multiplicity of interconnecting gas passages.

Reservoir 19 is connected to a suitable source of gas under pressure by means of a line 24 having a valve 25 therein. A vessel 26, containing a chemical absorbent such as a desiccant, may be included in line 24, to remove moisture or other contaminants in the gas which might cause deterioration of the equipment.

A suitable cross-sectional area for the test specimen is 3 to 4 square inches, and for convenient determination of permeability, this requires a reservoir of about 20 to 25 litres, filled with about 0.5 litre of material 23. The manometer should cover a range of about 30 centimeters of water pressure differential, readable to about 0.05 centimeter.

In carrying out a permeability determination, the sample 9 is sawn or drilled from a larger specimen of material to be tested. Compressed gas may be used to blow any dust or loose particles from the surface of the sample. The sample is inserted in the gasket 7 which in turn is placed between end pieces 2 and 10. The assembly is then compressed between pedestal 1 and jack 16 in the manner described. Valve 21 is closed and valve 25 is opened to allow pressurized gas to fill reservoir 19 to about 25 centimeters of water pressure. Valve 25 is closed and valve 21 is then opened to allow the gas to bleed through the sample. By means of a stop watch, the interval required for the pressure to fall from, say, 20 centimeters to 2 centimeters is noted. Alternatively, the drop in pressure can be measured over a predetermined interval, e.g., one minute.

The calculation of permeability value is based on the fundamental equation determining the passage of fluid through a permeable substance.

$$V = \frac{\lambda A}{\eta L}(P_h - P_l)t$$

Where:

$V$ = volume of fluid $A$ = area of permeable substance perpendicular to fluid flow
$L$ = length of fluid flow within permeable substance
$\eta$ = viscosity of permeating fluid
$t$ = time fluid flows
$P_h$ = pressure on upstream side
$P_l$ = pressure on downstream side
$\lambda$ = permeability When the fluid is a gas, the volume is conventionally calculated as the volume at the mean experimental pressure, i.e., $\frac{1}{2}(P_h + P_l)$. When V is in cm.$^3$, A in cm.$^2$, L in cm., $\eta$ in centipoises, $P_h$ and $P_l$ in atmospheres, and $t$ in seconds; then $\lambda$ is in darcys.

In the isothermal transient flow method the permeability is found from the relation:

$$\lambda = \frac{\eta L V_1}{A t P_a} \log_e \frac{P_2 - P_a}{P_1 - P_a} \cdot \frac{P_1 + P_a}{P_2 + P_a}$$

Where:

$\eta$ = viscosity of gas in centipoises
$L$ = length of specimen (cm.)
$V_1$ = volume of reservoir (cm.$^3$)
$A$ = cross sectional area of specimen (cm.$^2$)
$t$ = time for pressure to fall from $P_2$ to $P_1$ (sec.)
$P_a$ = external (outlet) pressure (atm.)
$P_2$ = pressure in reservoir at $t = 0$ (atm.)
$P_1$ = pressure in reservoir at $t = t$ (atm.)
$\lambda$ = permeability (darcies)

An alternative equivalent form of the relation is:

$$\lambda = \frac{2\eta L V_1}{A t P_a}\left(\coth^{-1}\frac{P_1}{P_a} - \coth^{-1}\frac{P_2}{P_a}\right)$$

I claim:

An apparatus for determining the gas permeability of a solid permeable body which comprises a sample holder having a gas transmitting chamber, a gas outlet chamber open to atmosphere, and a sample supporting member between said chambers, a gas delivery system comprising a gas reservoir, a gas feed tube leading from said reservoir to said gas transmitting chamber, and a gas supply conduit leading to said reservoir, a first valve in said gas feed tube, a second valve in said gas supply conduit, said valves being operable firstly to close said gas feed tube and open said gas supply conduit to charge said reservoir with gas and secondly to open said gas feed tube and close said gas supply conduit to place said reservoir in communication with said gas transmitting chamber, a manometer in said system between said valves, and means preventing a decrease in gas temperature due to gas expansion in said reservoir as a result of gas discharge from said system comprising a mass of strands of a metal of a specific heat not substantially less than 0.08 calorie per gram per degrees C. substantially uniformly distributed throughout the interior of said reservoir, each said strand being in engagement with a plurality of others of said strands to provide a high surface to volume ratio, said mass in any transverse section thereof having a multiplicity of interconnecting gas passages.

References Cited by the Examiner

UNITED STATES PATENTS

| | | | |
|---|---|---|---|
| 1,309,702 | 7/19 | Skinner | 73—38 |
| 2,633,015 | 3/53 | Morris | 73—38 |
| 2,776,562 | 1/57 | Davie et al. | 73—147 |

ISAAC LISANN, *Primary Examiner.*